US012799330B2

(12) United States Patent
Tsukada

(10) Patent No.: US 12,799,330 B2
(45) Date of Patent: Nov. 17, 2026

(54) THERMALLY CONDUCTIVE SILICONE COMPOSITION AND CURED PRODUCT THEREOF

(71) Applicant: Shin-Etsu Chemical Co., Ltd., Tokyo (JP)

(72) Inventor: Junichi Tsukada, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 467 days.

(21) Appl. No.: 18/566,236

(22) PCT Filed: May 31, 2022

(86) PCT No.: PCT/JP2022/022038
§ 371 (c)(1),
(2) Date: Dec. 1, 2023

(87) PCT Pub. No.: WO2022/255331
PCT Pub. Date: Dec. 8, 2022

(65) Prior Publication Data

US 2024/0294758 A1 Sep. 5, 2024

(30) Foreign Application Priority Data

Jun. 3, 2021 (JP) ................................ 2021-093349

(51) Int. Cl.
*C08L 83/04* (2006.01)
*C08K 5/3475* (2006.01)

(52) U.S. Cl.
CPC ............ *C08L 83/04* (2013.01); *C08K 5/3475* (2013.01); *C08K 2201/001* (2013.01)

(58) Field of Classification Search
CPC ....... C08L 83/04; C08L 83/06; C08K 5/3475; C08K 2201/001; C08K 2003/2227; C08G 77/12; C08G 77/20; C08G 77/18
See application file for complete search history.

(56) References Cited

U.S. PATENT DOCUMENTS

| | | | | |
|---|---|---|---|---|
| 4,990,552 | A | 2/1991 | Mori et al. | |
| 5,354,210 | A | 10/1994 | Koblitz et al. | |
| 2014/0371330 | A1* | 12/2014 | Hayashi | A61K 8/022 556/456 |
| 2015/0210853 | A1* | 7/2015 | Fujisawa | C08L 83/04 524/494 |
| 2015/0259585 | A1* | 9/2015 | Tasaki | C08L 83/04 524/425 |
| 2016/0068732 | A1* | 3/2016 | Kitazawa | B22F 1/10 252/75 |
| 2018/0022977 | A1* | 1/2018 | Tsuji | C09K 5/14 252/74 |
| 2019/0092944 | A1* | 3/2019 | Mizushima | C08K 3/36 |
| 2019/0309206 | A1* | 10/2019 | Tsuji | C08G 77/12 |
| 2021/0130561 | A1 | 5/2021 | Endo et al. | |
| 2021/0355363 | A1* | 11/2021 | Tsukada | C08K 3/22 |

FOREIGN PATENT DOCUMENTS

| | | | |
|---|---|---|---|
| JP | 1-190758 | A | 7/1989 |
| JP | 2938428 | B1 | 8/1999 |
| JP | 2938429 | B1 | 8/1999 |
| JP | 3952184 | B2 | 8/2007 |
| JP | 2007-231172 | A | 9/2007 |
| JP | 2017-165931 | A | 9/2017 |
| JP | 2019-1900 | A | 1/2019 |
| JP | 2020-41024 | A | 3/2020 |
| JP | 2020-63380 | A | 4/2020 |
| JP | 2020-66713 | A | 4/2020 |
| WO | WO 2018/079309 | A1 | 5/2018 |

OTHER PUBLICATIONS

International Search Report (PCT/ISA/210) issued in PCT/JP2022/022038 mailed on Aug. 9, 2022.
Extended European Search Report for European Application No. 22816078.4, dated May 23, 2025.

* cited by examiner

*Primary Examiner* — Andrew J. Oyer
(74) *Attorney, Agent, or Firm* — Birch, Stewart, Kolasch & Birch, LLP

(57) ABSTRACT

Provided is a thermally conductive silicone composition capable of being turned into a cured product that is superior in heat dissipation property and is able to suppress corrosion of metal wirings. The thermally conductive silicone composition contains:
(A) an organopolysiloxane having at least 2 silicon atom-bonded alkenyl groups per molecule, and having a kinetic viscosity of 10 to 100,000 $mm^2/s$ at 25° C.;
(B) an organohydrogenpolysiloxane having, per molecule, at least 2 hydrogen atoms that are directly bonded to silicon atoms;
(C) a thermally conductive filler having a thermal conductivity of not lower than 10 W/m·K;
(D) a dimethylpolysiloxane with one molecular chain end being blocked by a trialkoxy group;
(E) a platinum group metal-based curing catalyst;
(F) benzotriazole and/or a benzotriazole derivative; and
(G) an aliphatic unsaturated bond-free organopolysiloxane.

5 Claims, No Drawings

THERMALLY CONDUCTIVE SILICONE COMPOSITION AND CURED PRODUCT THEREOF

TECHNICAL FIELD

The present invention relates to a thermally conductive silicone composition and a cured product thereof.

BACKGROUND ART

It is widely known that electronic components such as LSI and IC chips generate heat during use, and that this causes performance degradation. In this regard, various heat dissipation techniques are used as means to solve this problem. For example, there is known a technique where a cooling member such as a heat sink is to be placed near a heat-generating part, and the two components are brought close to each other to facilitate an efficient heat transfer to the cooling member which is to be cooled in due course, thereby allowing heat dissipation of the heat-generating part to take place in an efficient manner. In such case, if there is a gap between the heat-generating part and the cooling member, that means that air with a low thermal conductivity is present therebetween, which makes it impossible for heat transfer to take place in an efficient manner and thereby prevents the temperature of the heat-generating part from being reduced sufficiently. In order to avoid this phenomenon, and for the purpose of getting rid of air that is present between the heat-generating part and the cooling member, heat dissipation sheets and heat dissipation greases are used as heat dissipation materials having favorable thermal conductivities and a conformability to the surface of a member (Patent documents 1 to 3).

Nowadays, there is an increasing trend in the input/output currents of power modules such as inverters for automotive applications, and there is also an increasing trend in the heat generated by coils and busbars themselves. As the temperatures of coils and busbars rise due to heat generation, electric resistance increases, which makes efficient heat dissipation inevitable; as a countermeasure, there have been employed a number of methods where a direct heat dissipation is facilitated by installing a heat dissipation material(s).

Meanwhile, metal wirings such as copper wires are used for coils and busbars, and their surfaces are generally coated with nickel or tin plating, or epoxy-coated, for example. While surface coating can suppress corrosion of metal wirings such as coils and busbars, corrosion may progress from where the metal is exposed due to a bending process, scratches, or pinholes in the coating, which is still far from reaching a fundamental solution. Particularly, there has been a problem that when cationic impurities are present in a heat dissipation material, they will be electrically attracted to and facilitate the corrosion of these members.

PRIOR ART DOCUMENTS

Patent Documents

Patent document 1: Japanese Patent No. 2938428
Patent document 2: Japanese Patent No. 2938429
Patent document 3: Japanese Patent No. 3952184

SUMMARY OF THE INVENTION

Problems to be Solved by the Invention

Thus, it is an object of the present invention to provide a thermally conductive silicone composition capable of being turned into a cured product (heat dissipation material) that is superior in heat dissipation property and is able to suppress corrosion of metal wirings.

Means to Solve the Problems

In order to solve the above problem, the inventor of the present invention diligently conducted a series of studies and completed the invention as follows. That is, the inventor found that a thermally conductive silicone composition containing an alkenyl group-containing organopolysiloxane having a particular kinetic viscosity, a particular organohydrogenpolysiloxane, a thermally conductive filler, a dimethylpolysiloxane with one molecular chain end being blocked by a trialkoxy group, benzotriazole and/or a benzotriazole derivative, and a particular organopolysiloxane, was able to suppress corrosion of metal wirings. Specifically, the present invention is to provide the following thermally conductive silicone composition and thermally conductive silicone cured product.

[1]

A thermally conductive silicone composition comprising:

(A) 100 parts by mass of an organopolysiloxane having at least 2 silicon atom-bonded alkenyl groups per molecule, and having a kinetic viscosity of 10 to 100,000 $mm^2/s$ at 25° C.;

(B) an organohydrogenpolysiloxane having, per molecule, at least 2 hydrogen atoms that are directly bonded to silicon atoms, the component (B) being in an amount where the number of the hydrogen atoms that are directly bonded to the silicon atoms is 0.5 to 1.5 per 1 alkenyl group in the component (A);

(C) 500 to 7,000 parts by mass of a thermally conductive filler having a thermal conductivity of not lower than 10 W/m·K;

(D) 10 to 300 parts by mass of a dimethylpolysiloxane with one molecular chain end being blocked by a trialkoxy group, that is represented by the following general formula (1)

[Chemical formula 1]

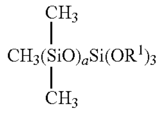

(1)

wherein $R^1$ independently represents an alkyl group having 1 to 6 carbon atoms, and a is a number of 5 to 100;

(E) an effective amount of a platinum group metal-based curing catalyst;

(F) benzotriazole and/or a benzotriazole derivative represented by the following general formula (2), the component (F) being in an amount of 10 to 500 ppm per a total mass of the components (A) to (D)

[Chemical formula 2]

(2)

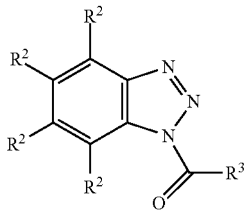

wherein $R^2$ independently represents a hydrogen atom or a monovalent hydrocarbon group having 1 to 6 carbon atoms, and $R^3$ represents a hydrogen atom or a monovalent organic group; and (G) 1 to 100 parts by mass of an organopolysiloxane represented by the following general formula (3)

[Chemical formula 3]

(3)

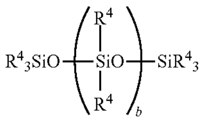

wherein $R^4$ independently represents an aliphatic unsaturated bond-free monovalent hydrocarbon group having 1 to 10 carbon atoms, and b is a number of 2 to 2,000.

[2]

The thermally conductive silicone composition according to [1], wherein the component (G) is an organopolysiloxane represented by the following general formula (4)

[Chemical formula 4]

(4)

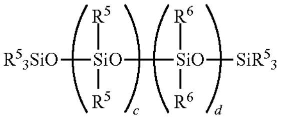

wherein $R^5$ independently represents an alkyl group having 1 to 10 carbon atoms, $R^6$ represents a phenyl group, c and d each represent a number of 1 to 20, where the siloxane units in the parentheses are arranged in a random, alternating or block order.

[3]

The thermally conductive silicone composition according to [1] or [2], wherein the thermally conductive silicone composition further comprises at least one kind of addition reaction control agent (H) selected from the group consisting of an acetylene compound, a nitrogen compound, an organic phosphorus compound, an oxime compound, and an organic chloro compound.

[4]

The thermally conductive silicone composition according to any one of [1] to [3], wherein $R^3$ in the general formula (2) represents a hydrogen atom, a monovalent hydrocarbon group having 1 to 10 carbon atoms, or a group represented by the following formula (5)

[Chemical formula 5]

(5)

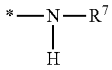

[wherein $R^7$ represents a monovalent hydrocarbon group having 1 to 15 carbon atoms, or $-(CH_2)_e-Si(OR^8)_3$, and * represents a bond {$R^8$ independently represents an alkyl group having 1 to 4 carbon atoms, or a $SiR^9{}_3$ group, and e is an integer of 1 to 6} ($R^9$ independently represents an alkyl group having 1 to 4 carbon atoms).]

[5]

A cured product of the thermally conductive silicone composition according to any one of [1] to [4].

Effects of the Invention

The thermally conductive silicone composition of the present invention is such that the cured product thereof is superior in heat dissipation property; and that by combining a proper amount of benzotriazole and/or a benzotriazole derivative and a proper amount of an oil component that is unassociated with a cross-linked structure and easily bleeds, a stable film can be formed on the surface of a metal such as copper to suppress corrosion. Thus, the thermally conductive silicone composition of the present invention is suitable for use as a thermally conductive material (heat dissipation material) dedicated to a cooling member for metal wirings such as busbars and coils.

MODE FOR CARRYING OUT THE INVENTION

The present invention is described in greater detail hereunder.

[Thermally Conductive Silicone Composition]

<(A) Alkenyl Group-Containing Organopolysiloxane>

An alkenyl group-containing organopolysiloxane as a component (A) is an organopolysiloxane having at least 2, preferably 2 to 10, more preferably 2 to 5 silicon atom-bonded alkenyl groups per molecule. In general, the main chain moiety thereof is basically composed of repeating diorganosiloxane units; part of the molecular structure may include a branched structure, or the molecular structure may be cyclic, yet a linear diorganopolysiloxane is preferred in terms of mechanical strength etc. and property of a cured product.

As an alkenyl group, there may be listed, for example, those normally having about 2 to 8 carbon atoms, such as a vinyl group, an allyl group, a propenyl group, an isopropenyl group, a butenyl group, a hexenyl group and a cyclohexenyl group, among which a lower alkenyl group such as a vinyl group and an allyl group is preferred, and a vinyl group is particularly preferred. Here, the alkenyl groups that are to be bonded to the silicon atoms may be present at the molecular chain ends of the organopolysiloxane, and/or in the midway of such molecular chain; in terms of flexibility of the cured product obtained, it is preferred that the alkenyl groups be bonded to the silicon atoms at the molecular chain ends.

As a group(s) other than alkenyl group that are to be bonded to the silicon atoms, a substituted or unsubstituted monovalent hydrocarbon group may be selected, examples of which include an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group and a dodecyl group; a cycloalkyl group such as a cyclopentyl group, a cyclohexyl group and a cycloheptyl group; an aryl group such as a phenyl group, a tolyl group, a xylyl group, a naphthyl group and a biphenylyl group; an aralkyl group such as a benzyl group, a phenylethyl group, a phenylpropyl group and a methylbenzyl group; and a group obtained by substituting part of or all the hydrogen atoms bonded to the carbon atoms in any of these groups with, for example, halogen atoms such as fluorine, chlorine and bromine atoms or a cyano group, examples of such substituted group including a chloromethyl group, 2-bromoethyl group, 3-chloropropyl group, 3,3,3-trifluoropropyl group, chlorophenyl group, fluorophenyl group, cyanoethyl group and 3,3,4,4,5,5,6,6,6-nonafluorohexyl group. Among them, as a group(s) other than alkenyl group that are to be bonded to the silicon atoms in the organopolysiloxane as the component (A), preferred is a group having 1 to 10, more preferably 1 to 6 carbon atoms. Specifically, preferred are a substituted or unsubstituted alkyl group having 1 to 3 carbon atoms, such as a methyl group, ethyl group, propyl group, chloromethyl group, bromoethyl group, 3,3,3-trifluoropropyl group and cyanoethyl group; and a substituted or unsubstituted phenyl group such as a phenyl group, chlorophenyl group and fluorophenyl group. Particularly preferred is a methyl group. Further, the groups other than alkenyl group that are bonded to the silicon atoms may all be identical to one another, or different from one another.

A kinetic viscosity of the component (A) at 25° C. is in a range of 10 to 100,000 $mm^2/s$, preferably 100 to 50,000 $mm^2/s$. A kinetic viscosity lower than 10 $mm^2/s$ will make it difficult for the component (A) to be uniformly mixed with a thermally conductive filler; and a kinetic viscosity higher than 100,000 $mm^2/s$ will make a kneading operation itself difficult due to an increased viscosity of the composition. Here, the kinetic viscosity is a value measured by an Ostwald viscometer at 25° C.

Examples of the component (A) may include, but are not limited to a dimethylpolysiloxane with both molecular chain ends being blocked by dimethylvinylsiloxy groups; a dimethylpolysiloxane-methylvinylpolysiloxane copolymer with one molecular chain end being blocked by a dimethylvinylsiloxy group and the other molecular chain end being blocked by a trimethylsiloxy group; a dimethylsiloxane-methylvinylsiloxane copolymer with both molecular chain ends being blocked by trimethylsiloxy groups; a methylvinylpolysiloxane with both molecular chain ends being blocked by trimethylsiloxy groups; and a dimethylsiloxane-methylvinylpolysiloxane copolymer with both molecular chain ends being blocked by dimethylvinylsiloxy groups.

One kind of such component (A) may be used alone, or two or more kinds thereof may be used in combination. It is preferred that the component (A) be contained in the composition by an amount of 0.5 to 10% by mass, more preferably 1 to 5% by mass.

<(B) Organohydrogenpolysiloxane>

An organohydrogenpolysiloxane as a component (B) is an organohydrogenpolysiloxane having, per molecule, at least 2, preferably 2 to 30, more preferably 2 to 20 hydrogen atoms that are directly bonded to silicon atoms (Si—H groups), and is a component acting as a cross-linking agent for the component (A). That is, the Si—H groups in the component (B) and the alkenyl groups in the component (A) are added to each other by a hydrosilylation reaction promoted by a later-described platinum group metal-based curing catalyst as the component (E), thereby imparting a crosslinked structure-containing three dimensional network structure to the cured product obtained. Here, if the number of the Si—H groups in the organohydrogenpolysiloxane as the component (B) is smaller than 2 per molecule, there is a concern that the composition may not be cured.

The component (B) may be linear, branched or cyclic; and may even have several of these structures per molecule. Further, the Si—H groups may be present at the molecular chain ends and/or in the midway of the molecular chain.

As an organic group(s) other than Si—H group that are to be bonded to the silicon atoms, preferred is a substituted or unsubstituted monovalent hydrocarbon group having 1 to 12 carbon atoms, particularly preferably an aliphatic unsaturated bond-free substituted or unsubstituted monovalent hydrocarbon group having 1 to 6 carbon atoms. Specific examples of such organic group(s) include an alkyl group such as a methyl group, an ethyl group, a propyl group, a butyl group, a hexyl group, and a dodecyl group; an aryl group such as a phenyl group; an aralkyl group such as a 2-phenylethyl group and a 2-phenylpropyl group; a halogen-substituted hydrocarbon group such as a chloromethyl group and a 3,3,3-trifluoropropyl group; and an epoxy-substituted hydrocarbon group such as a 2-glycidoxyethyl group, a 3-glycidoxypropyl group, and a 4-glycidoxybutyl group. Particularly, a methyl group is preferred.

Examples of the component (B) may include, but are not limited to a copolymer composed of $(CH_3)_2HSiO_{1/2}$ unit and $(CH_3)_2SiO_{2/2}$ unit; a copolymer composed of $(CH_3)_2HSiO_{1/2}$ unit, $(CH_3)_3SiO_{1/2}$ unit, and $(CH_3)_2SiO$ unit; a copolymer composed of $(CH_3)_3SiO_{1/2}$ unit, $(CH_3)_2SiO_{2/2}$ unit, and $(CH_3)HSiO_{2/2}$ unit; a copolymer composed of $(CH_3)_2HSiO_{1/2}$ unit, $(CH_3)_3SiO_{1/2}$ unit, $(CH_3)_2SiO_{2/2}$ unit, and $(CH_3)HSiO_{2/2}$ unit; a copolymer composed of $(CH_3)_3SiO_{1/2}$ unit and $(CH_3)HSiO_{2/2}$ unit; a copolymer composed of $(CH_3)_2HSiO_{1/2}$ unit, $(CH_3)_2SiO_{2/2}$ unit, and $(CH_3)HSiO_{2/2}$ unit; a copolymer composed of $(CH_3)_3SiO_{1/2}$ unit, $(CH_3)_2HSiO_{1/2}$ unit, and $(CH_3)HSiO_{2/2}$ unit; a cyclic polymer composed of $(CH_3)HSiO_{2/2}$ unit; and a cyclic copolymer composed of $(CH_3)HSiO_{2/2}$ unit and $(CH_3)_2SiO_{2/2}$ unit.

One kind of such organohydrogenpolysiloxane as the component (B) may be used alone, or two or more kinds thereof may be used in combination. The component (B) is to be added in an amount where the number of the Si—H groups derived from the component (B) will be 0.5 to 1.5, preferably 0.7 to 1.3, per 1 alkenyl group derived from the component (A). If the number of the Si—H groups derived from the component (B) is smaller than 0.5 per 1 alkenyl group derived from the component (A), the composition may not be cured, or the cured product may exhibit an insufficient strength so that its shape as a molded body cannot be retained to such an extent that the cured product itself may not be able to be handled. Further, if the number of the Si—H groups derived from the component (B) is greater than 1.5 per 1 alkenyl group derived from the component (A), the flexibility of the cured product may be impaired due to an extremely high cross-linking density.

<(C) Thermally Conductive Filler>

As a component (C) which is a thermally conductive filler, there is used a filler having a thermal conductivity of not lower than 10 W/m·K, preferably not lower than 15 W/m·K. This is because if the thermal conductivity is lower than 10 W/m·K, the thermal conductivity of the thermally conductive silicone composition itself will decrease. Examples of such thermally conductive filler may include, but are not limited to an aluminum powder, a copper powder, a silver powder, an iron powder, a nickel powder, a gold powder, a tin powder, a metallic silicon powder, an aluminum nitride powder, a boron nitride powder, an aluminum oxide (alumina) powder, a magnesium oxide (magnesia) powder, a diamond powder, a carbon powder, an indium powder, a gallium powder, and a zinc oxide powder. Further, the component (C) may have an amorphous or spherical shape.

The component (C) preferably has an average particle size of 0.1 to 100 m, more preferably 0.1 to 90 m. An average particle size of smaller than 0.1 m may lead to a deteriorated filling property to the composition; an average particle size of lager than 100 m may lead to a larger thermal resistance due to a roughened surface of the cured product after molding. Here, in the present invention, average particle size is a volume average diameter [MV] measured by Microtrac MT3300EX manufactured by Nikkiso Co., Ltd.

One kind of such component (C) may be used alone, or two or more kinds thereof may be used in combination.

The component (C) is added in an amount of 500 to 7,000 parts by mass, preferably 1,000 to 6,500 parts by mass, more preferably 2,000 to 6,000 parts by mass, per 100 parts by mass of the component (A). An amount of smaller than 500 parts by mass will lead to a decreased thermal conductivity of the cured product; an amount of larger than 7,000 parts by mass will result in a poor moldability due to an increased viscosity of the composition.

<(D) Dimethylpolysiloxane with One Molecular Chain End being Blocked by Trialkoxy Group>

A component (D) is a dimethylpolysiloxane with one molecular chain end being blocked by a trialkoxy group, that is represented by the following general formula (1).

[Chemical formula 6]

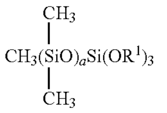

(1)

(In the formula (1), $R^1$ independently represents an alkyl group having 1 to 6 carbon atoms; a is a number of 5 to 100.)

As the alkyl group having 1 to 6 carbon atoms, which is represented by $R^1$ in the formula (1), there may be listed, for example, a methyl group, an ethyl group, a propyl group, an isopropyl group, a butyl group, an isobutyl group, a tert-butyl group, a pentyl group, a neopentyl group, and a hexyl group, of which a methyl group is preferred.

a is a number of 5 to 100, preferably 10 to 60. When a is smaller than 5, the dispersibility of the thermally conductive filler may deteriorate; when a is larger than 100, thermal conductivity may deteriorate.

The component (D) is added in an amount of 10 to 300 parts by mass, preferably 10 to 200 parts by mass, per 100 parts by mass of the component (A). When the component (D) is added in an amount of smaller than 10 parts by mass per 100 parts by mass of the component (A), the composition will exhibit a higher viscosity due to an impaired dispersibility of the thermally conductive filler in the thermally conductive silicone composition; when the component (D) is added in an amount of greater than 300 parts by mass per 100 parts by mass of the component (A), there may be observed a deteriorated thermal conductivity as such amount shall dilute the thermally conductive filler.

<(E) Platinum Group Metal-Based Curing Catalyst>

The platinum group metal-based curing catalyst as the component (E) is a catalyst for promoting the addition reaction between the alkenyl groups derived from the component (A) and the Si—H groups derived from the component (B); a known catalyst for use in hydrosilylation reaction may for example be used. Specific examples thereof include an elemental platinum group metal such as platinum (including platinum black), rhodium and palladium; a platinum chloride, chloroplatinic acid and chloroplatinate, such as $H_2PtCl_4 \cdot nH_2O$, $H_2PtCl_6 \cdot nH_2O$, $NaHIPtCl_6 \cdot nH_2O$, $KaHIPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, and $Na_2HPtCl_4 \cdot nH_2O$ (provided that in these formulae, n is an integer of 0 to 6, preferably 0 or 6); an alcohol-modified chloroplatinic acid (see the specification of U.S. Pat. No. 3,220,972); a complex of chloroplatinic acid and olefin (see the specifications of U.S. Pat. Nos. 3,159,601, 3,159,662 and 3,775,452); a catalyst with a platinum group metal such as platinum black and palladium being supported on a carrier such as aluminum oxide, silica and carbon; a rhodium-olefin complex; chlorotris(triphenylphosphine)rhodium (Wilkinson's catalyst); and a complex of a platinum chloride, chloroplatinic acid or chloroplatinate with a vinyl group-containing siloxane, particularly with a vinyl group-containing cyclic siloxane. The component (E) may be added in a so-called catalytic amount; normally, it may be used in an amount of about 0.1 to 1,000 ppm in terms of mass of platinum group metal elements with respect to the component (A). As the component (E), there may also be used a solution prepared by dissolving any of the above various platinum group metal catalysts into a solvent such as 2-ethylhexanol.

<(F) Benzotriazole and/or Benzotriazole Derivative>

A component (F) is benzotriazole and/or a benzotriazole derivative represented by the following general formula (2).

[Chemical formula 7]

(2)

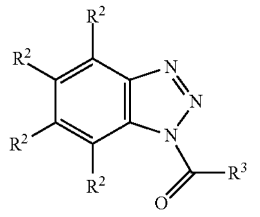

(In the formula (2), $R^2$ independently represents a hydrogen atom or a monovalent hydrocarbon group having 1 to 6 carbon atoms; $R^3$ represents a hydrogen atom or a monovalent organic group.)

In the formula (2), as the monovalent hydrocarbon group having 1 to 6 carbon atoms, which is represented by $R^2$, there may be listed, for example, alkyl groups such as a methyl group, an ethyl group, a propyl group, an isopropyl group, a butyl group, an isobutyl group, a tert-butyl group, a pentyl group, a neopentyl group, a hexyl group, and a cyclohexyl group; and groups obtained by substituting part of or all the hydrogen atoms in any of these groups with, for example, halogen atoms such as fluorine, bromine and chlorine atoms, or even a cyano group, examples of such substituted groups including a chloromethyl group, a chloropropyl group, a bromoethyl group, a trifluoropropyl group, and a cyanoethyl group. Even among these examples, a hydrogen atom or a methyl group is preferred in terms of synthesis.

Examples of the monovalent organic group represented by $R^3$ include monovalent hydrocarbon groups having 1 to 10 carbon atoms, and a group represented by the following formula (5). As such monovalent hydrocarbon groups having 1 to 10 carbon atoms, there may be listed, for example, an alkyl group such as a methyl group, an ethyl group, a propyl group, an isopropyl group, a butyl group, an isobutyl group, a tert-butyl group, a pentyl group, a neopentyl group, a hexyl group, and a cyclohexyl group; an aryl group such as a phenyl group, a tolyl group, a xylyl group, and a naphthyl group; and an aralkyl group such as a benzyl group, a phenylethyl group, and a phenylpropyl group.

[Chemical formula 8]

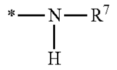

(5)

[In the formula (5), $R^7$ represents a monovalent hydrocarbon group having 1 to 15 carbon atoms, or $—(CH_2)_e—Si(OR^8)_3$, and * represents a bond {$R^8$ independently represents an alkyl group having 1 to 4 carbon atoms, or a $SiR^9_3$ group, and e is an integer of 1 to 6, preferably 1 to 3}($R^9$ independently represents an alkyl group having 1 to 4 carbon atoms).]

Examples of the monovalent hydrocarbon group represented by $R^7$ include an alkyl group such as a methyl group, an ethyl group, a propyl group, a butyl group, a hexyl group, and a dodecyl group; an aryl group such as a phenyl group; and an aralkyl group such as a 2-phenylethyl group and a 2-phenylpropyl group.

Examples of the alkyl groups represented by $R^8$ and $R^9$ include a methyl group, an ethyl group, and a propyl group.

Specific examples of the component (F) are as follows.

[Chemical formula 9]

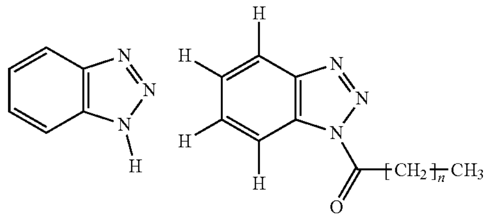

(In this formula, n represents an integer of 0 to 6.)

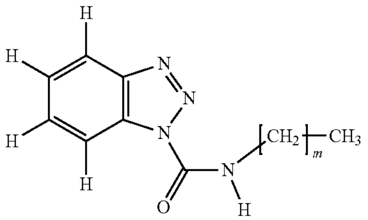

(In this formula, m represents an integer of 0 to 6.)

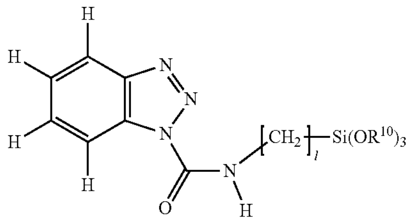

(In this formula, 1 is an integer of 1 to 6; each $R^{10}$ independently represents an alkyl group having 1 to 4 carbon atoms or a trialkylsilyl group (each alkyl group in the trialkylsilyl group has 1 to 4 carbon atoms).)

The component (F) is added in an amount of 10 to 500 ppm, preferably 20 to 400 ppm, more preferably 30 to 300 ppm, per a total mass of the components (A) to (D). When the component (F) is added in an amount of less than 10 ppm, a sufficient anticorrosion property cannot be imparted to a target metal; when the component (F) is added in an amount of more than 500 ppm, an economic inefficiency will be incurred as the platinum group metal-based curing catalyst as the component (E) has to be added in a large amount.

<(G) Aliphatic Unsaturated Bond-Free Organopolysiloxane>

A component (G) is an aliphatic unsaturated bond-free organopolysiloxane represented by the following general formula (3).

[Chemical formula 10]

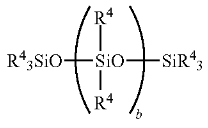

(3)

(In the formula (3), $R^4$ independently represents an aliphatic unsaturated bond-free monovalent hydrocarbon group having 1 to 10 carbon atoms; b is a number of 2 to 2,000.)

The component (G) is present as an oil in the composition without affecting the cross-linked structure; therefore, the anticorrosion effect can be enhanced as the components (G) and (F) gradually migrate from inside the composition to the surface of a target metal.

Examples of the monovalent hydrocarbon group represented by $R^4$ include an alkyl group such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, and a decyl group; a cycloalkyl group such as a cyclopentyl group, a cyclohexyl group and a cycloheptyl group; an aryl group such as a phenyl group, a tolyl group, a xylyl group, and a naphthyl group; an aralkyl group such as a benzyl group, a phenylethyl group, a phenylpropyl group and a methylbenzyl group; and a group obtained by substituting part of or all the hydrogen atoms bonded to the carbon atoms in any of these groups with, for example, halogen atoms such as fluorine, chlorine and bromine atoms or a cyano group, examples of such substituted group including a chloromethyl group, 2-bromoethyl group, 3-chloropropyl group, 3,3,3-trifluoropropyl group, chlorophenyl group, fluorophenyl group, cyanoethyl group and 3,3,4,4,5,5,6,6,6-nonafluorohexyl group. Among these examples, a methyl group and a phenyl group are preferred.

b is a number of 2 to 2,000, preferably a number of 2 to 200.

It is preferred that the component (G) contain a phenyl group-containing organopolysiloxane represented by the following general formula (4).

[Chemical formula 11]

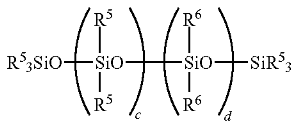

(4)

(In the formula (4), $R^5$ independently represents an alkyl group having 1 to 10 carbon atoms; $R^6$ represents a phenyl group; c and d each represent a number of 1 to 20, where the siloxane units in the parentheses are arranged in a random, alternating or block order.)

Examples of the alkyl group represented by $R^5$ include a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, and a decyl group, of which a methyl group is preferred.

The component (G) is added in an amount of 1 to 100 parts by mass, preferably 2 to 90 parts by mass, more preferably 5 to 80 parts by mass, per 100 parts by mass of the component (A). When the component (G) is added in an amount of smaller than 1 part by mass, the anticorrosion effect is less likely to be achieved; when the component (G) is added in an amount of larger than 100 parts by mass, there will be too much oil bleeding such that the viscosity of the composition may increase significantly over time, and that the cured product may exhibit a significantly increased hardness.

With respect to a total amount of the component (G) by mass, it is preferred that the compound represented by the general formula (4) be contained in the component (G) at a ratio of 5 to 50% by mass, more preferably 10 to 40% by mass.

<(H) Addition Reaction Control Agent>

As a component (H), an addition reaction control agent can further be added to the thermally conductive silicone composition of the present invention for the purpose of extending the shelf life and pot life of the composition by controlling the catalytic activity of the component (E).

As the component (H), there may be used a known addition reaction control agent. For example, there may be listed an acetylene compound such as 1-ethynyl-1-cyclohexanol, 3-butyn-1-ol, and ethynyl methylidene carbinol; a nitrogen compound; an organic phosphorus compound; an oxime compound; and an organic chloro compound.

The component (H) may be used in an effective amount, and is preferably added in an amount of about 0.01 to 1 part by mass per 100 parts by mass of the component (A); the component (H) may be directly added to the composition as it is, or be diluted by a solvent such as toluene before use.

<(I) Filler>

As a component (I), a filler other than the component (C) may further be added to the thermally conductive silicone composition of the present invention for the purpose of adjusting the viscosity of the composition and the hardness of the cured product.

As the component (I), preferred are aluminum hydroxide and silica as being inexpensive and having relatively small specific weights.

The component (I) preferably has an average particle size of 0.1 to 100 μm, more preferably 1 to 80 μm.

If adding the component (I), in terms of thermal conductivity of the composition, it is preferred that the component (I) be added in an amount of 100 to 3,000 parts by mass, more preferably 500 to 1,500 parts by mass, per 100 parts by mass of the component (A). This component (I) may be directly added to the thermally conductive silicone composition of the present invention as it is, or be previously mixed with the component (C) before being added to the composition.

In addition to the above components, the thermally conductive silicone composition of the present invention may further contain a coloring material, an antioxidant and the like to the extent that the purpose of the present invention is not undermined.

[Method for Producing Thermally Conductive Silicone Composition]

The thermally conductive silicone composition of the present invention is produced by uniformly mixing the abovementioned components. Mixing may be performed in accordance with a known method, and examples of a mixing device may include Trimix, Twinmix, and Planetary Mixer (all are registered trademarks for mixers by INOUE MFG., INC.); Ultramixer (registered trademark for mixer by MIZUHO INDUSTRIAL CO., LTD.); and HIVIS DISPER MIX (registered trademark for mixer by Tokushu Kika Kogyo Co., Ltd.). Here, all the components that are to be added may be mixed together all at once, or one or more of these components may be separately mixed in a stepwise manner; however, it is preferred that the components (C) and (D) be added simultaneously.

[Method for Producing Thermally Conductive Silicone Cured Product]

The thermally conductive silicone composition of the present invention can be turned into a cured product when heated at a temperature of preferably 80 to 180° C., particularly preferably 90 to 170° C. for 30 to 150 min, especially 40 to 140 min.

[Thermal Conductivity of Thermally Conductive Silicone Cured Product]

It is preferred that the cured product (molded body) in the present invention have a thermal conductivity of not lower than 3.0 W/m·K, more preferably not lower than 4.0 W/mK, when measured by a hot disk method at 25° C. Here, while there is no particular upper limit to the thermal conductivity of the cured product (molded body), the thermal conductivity thereof is, for example, not higher than 40 W/m·K if using magnesium oxide.

WORKING EXAMPLES

The present invention is described in detail hereunder with reference to working and comparative examples; however, the present invention shall not be limited to the following working examples.

[Preparation of Thermally Conductive Silicone Composition]

The components (A) to (H) used in the working examples are as follows.

Component (A)

Dimethylpolysiloxane with both ends being blocked by dimethylvinylsilyl groups (kinetic viscosity at 25° C.: 600 $mm^2/s$)

Component (B)

Organohydrogenpolysiloxane represented by the following formula

[Chemical formula 12]

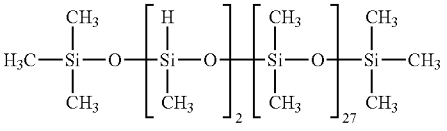

(Siloxane units in the brackets are arranged in an arbitrary order.)

Component (C)

(C-1): Alumina powder (average particle size: 1 m, thermal conductivity: 27 W/m·K)

(C-2): Alumina powder (average particle size: 10 m, thermal conductivity: 27 W/m·K)

(C-3): Alumina powder (average particle size: 28 m, thermal conductivity: 27 W/m·K)

(C-4): Alumina powder (average particle size: 70 m, thermal conductivity: 27 W/m·K)

(C-5): Magnesia powder (average particle size: 55 m, thermal conductivity: 40 W/m·K)

Component (D)

Dimethylpolysiloxane with one molecular chain end being blocked by trimethoxy group, that is represented by the following formula

[Chemical formula 13]

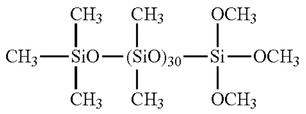

Component (E)

5% chloroplatinic acid 2-ethylhexanol solution

Component (F)

(F-1): Compound represented by the following formula

[Chemical formula 14]

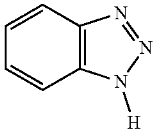

(F-2): Compound represented by the following formula

[Chemical formula 15]

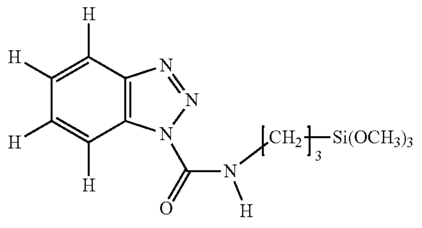

Component (G)

(G-1): Dimethylpolysiloxane represented by the following formula

[Chemical formula 16]

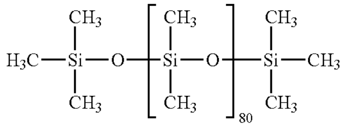

(G-2): Methylphenylpolysiloxane represented by the following formula

[Chemical formula 17]

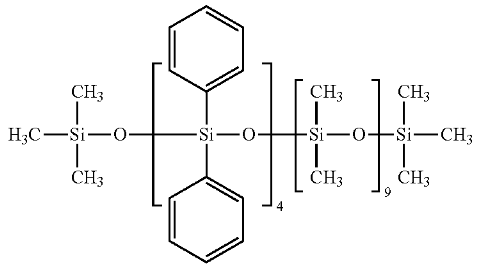

(In this formula, siloxane units in the brackets are arranged in an arbitrary order.)

Component (H)

Ethynyl methylidene carbinol

Component (I)

(I-1): Aluminum hydroxide powder (average particle size: 1 m, thermal conductivity: 3.2 W/m·K)

(I-2): Aluminum hydroxide powder (average particle size: 12 m, thermal conductivity: 3.2 W/m·K)

(I-3): Aluminum hydroxide powder (average particle size: 64 m, thermal conductivity: 3.2 W/m·K)

Working Examples 1 to 6; Comparative Examples 1 to 5

The following components were sequentially added at the compounding ratios (parts by mass) shown in Tables 1 and 2. Using a 5 L planetary mixer (by INOUE MFG., INC.), a previously prepared mixture of the components (A) and (D) and a previously prepared mixture of the components (C) and (I) were kneaded for 60 min. Next, the components (B), (E), (F), (G) and (H) were added thereto before performing kneading for another 30 min, thereby obtaining a thermally conductive silicone composition.

[Molding Method]

The thermally conductive silicone composition prepared was poured into a mold of a size of 60 mm×60 mm×6 mm, followed by sandwiching the opening section of the mold with two pieces of PET film, and then using a press-molding machine to cure the composition at 120° C. for 10 min, thereby obtaining a thermally conductive silicone cured product (thermally conductive silicone sheet).

[Evaluation Method]

Thermal Conductivity:

The thermal conductivity of the cured product was measured using two pieces of the 6 mm-thick sheet obtained in each of the working examples 1 to 6 and comparative examples 1 to 5, and there was used a thermal conductivity meter (TPA-501 by KYOTO ELECTRONICS MANUFACTURING CO., LTD.) for measurement.

Hardness:

The hardness of the thermally conductive silicone cured product was measured by an Asker C Durometer specified in SRIS0101.

Copper Corrosion Test (1) Copper Plate Cleansing

After wiping off the oil and fat on the surface of a copper plate with a gauze impregnated with acetone, the copper plate was then dipped in a 10% by mass sulfuric acid aqueous solution for 15 min. The copper plate taken out was then washed with pure water and dried before being used in the test.

(2) Testing Procedure

The thermally conductive silicone cured product molded was placed on the above copper plate and left to stand still for 24 hours. Later, the copper plate from which the thermally conductive silicone cured product had been removed was stored in a high-temperature and high-humidity tank of 85° C., 85% RH so as to be aged. The copper plate was then taken out after an aging time(s) of 100 hours, 500 hours, and 1,000 hours had elapsed, where an observation was made as to whether or not the surface of the copper plate had been corroded.

TABLE 1

| | | Working example 1 | Working example 2 | Working example 3 | Working example 4 | Working example 5 | Working example 6 |
|---|---|---|---|---|---|---|---|
| (A) | | 100 | 100 | 100 | 100 | 100 | 100 |
| (B) | | 20 | 20 | 20 | 20 | 20 | 20 |
| (C) | (C-1) | 840 | 840 | 840 | 1580 | 1580 | 1580 |
| | (C-2) | — | — | — | 670 | 670 | 670 |
| | (C-3) | 1080 | 1080 | 1080 | — | — | — |
| | (C-4) | — | — | — | 890 | 890 | 890 |
| | (C-5) | — | — | — | 1560 | 1560 | 1560 |
| | Total parts by mass of (C) | 1920 | 1920 | 1920 | 4700 | 4700 | 4700 |
| (D) | | 176 | 176 | 176 | 200 | 200 | 200 |
| (E) | | 2.2 | 2.2 | 2.2 | 2.2 | 2.2 | 2.2 |
| (F) | (F-1) | 0.17 | — | — | 0.18 | — | — |
| | (F-2) | — | 0.17 | 0.17 | — | 0.40 | 0.40 |
| (G) | (G-1) | 18.5 | 3 | 18.5 | 30 | 50 | 30 |
| | (G-2) | 6.5 | 2 | 6.5 | 14 | 30 | 14 |
| | Total parts by mass of (G) | 25 | 5 | 25 | 44 | 80 | 44 |
| (H) | | 0.4 | 0.4 | 0.4 | 0.4 | 0.3 | 0.2 |
| (I) | (I-1) | 310 | 310 | 310 | — | — | — |
| | (I-2) | — | — | — | 980 | 980 | 980 |
| | (I-3) | 850 | 850 | 850 | — | — | — |
| Ratio of [Si—H in component (B)]/[Si—Vi in component (A)] | | 1.24 | 1.24 | 1.24 | 1.24 | 1.24 | 1.24 |
| Amount of component (F) per total amount of components (A) to (D) (ppm) | | 50 | 50 | 50 | 33 | 74 | 74 |
| Thermal conductivity (W/m · K) | | 3.2 | 3.3 | 3.2 | 5.2 | 4.9 | 5.3 |
| Asker C hardness | | 10 | 14 | 11 | 20 | 16 | 19 |
| Copper corrosion test | 100 hours | No corrosion observed | No corrosion observed | No corrosion observed | No corrosion observed | No corrosion observed | No corrosion observed |
| | 500 hours | No corrosion observed | No corrosion observed | No corrosion observed | No corrosion observed | No corrosion observed | No corrosion observed |
| | 1000 hours | No corrosion observed | No corrosion observed | No corrosion observed | No corrosion observed | No corrosion observed | No corrosion observed |

TABLE 2

| | | Comparative example 1 | Comparative example 2 | Comparative example 3 | Comparative example 4 | Comparative example 5 |
|---|---|---|---|---|---|---|
| (A) | | 100 | 100 | 100 | 100 | 100 |
| (B) | | 20 | 36 | 20 | 20 | 20 |
| (C) | (C-1) | 840 | 840 | 840 | 840 | 840 |
| | (C-3) | 1080 | 1080 | 1080 | 1080 | 1080 |
| | Total parts by mass of (C) | 1920 | 1920 | 1920 | 1920 | 1920 |

TABLE 2-continued

| | | Comparative example 1 | Comparative example 2 | Comparative example 3 | Comparative example 4 | Comparative example 5 |
|---|---|---|---|---|---|---|
| (D) | | 176 | 176 | 176 | 176 | 176 |
| (E) | | 2.2 | 2.2 | 2.2 | 2.2 | 2.2 |
| (F-2) | | — | 2.2 | 0.02 | 0.17 | 0.17 |
| (G) | (G-1) | 18.5 | 18.5 | 18.5 | — | 90 |
| | (G-2) | 6.5 | 6.5 | 6.5 | — | 60 |
| | Total parts by mass of (G) | 25 | 25 | 25 | 0 | 150 |
| (H) | | 0.4 | 0.0 | 0.4 | 0.4 | 0.4 |
| (I) | (I-1) | 310 | 310 | 310 | 310 | 310 |
| | (1-3) | 850 | 850 | 850 | 850 | 850 |
| Ratio of [Si—H in component (B)]/[Si—Vi in component (A)] | | 1.24 | 2.23 | 1.24 | 1.24 | 1.24 |
| Amount of component (F) per total amount of components (A) to (D) (ppm) | | 0 | 648 | 6 | 50 | 50 |
| Thermal conductivity (W/m · K) | | 3.2 | Curing failed | 3.2 | 3.2 | 1.6 |
| Asker C hardness | | 10 | | 10 | 16 | 4 |
| Copper corrosion test | 100 hours | Corrosion observed | | Corrosion observed | No corrosion observed | No corrosion observed |
| | 500 hours | ↑ | | ↑ | Corrosion observed | No corrosion observed |
| | 1000 hours | ↑ | | ↑ | ↑ | No corrosion observed |

The thermally conductive silicone cured product obtained in each of the working examples 1 to 6 had a thermal conductivity of not lower than 3.0 W/m·K, and yielded no corrosion even with the aging time of 1,000 hours in the copper corrosion test.

In contrast, copper corrosion was observed when the component (F) was contained in an insufficient amount as were the cases with the comparative examples 1 and 3. Meanwhile, in the comparative example 2 where the component (F) was added in an excessive amount, a cured product was unable to be obtained due to deactivation of the component (E). Further, corrosion was observed after 500 hours in the copper corrosion test with a composition that did not contain the component (G) as was the case with the comparative example 4. Also, when the component (G) was added in an excessive amount as was the case with the comparative example 5, the ratio of the thermally conductive filler dropped such that the thermal conductivity fell short of 3.0 W/m·K.

The invention claimed is:

1. A thermally conductive silicone composition comprising:

(A) 100 parts by mass of an organopolysiloxane having at least 2 silicon atom-bonded alkenyl groups per molecule, and having a kinetic viscosity of 10 to 100,000 $mm^2/s$ at 25° C.;

(B) an organohydrogenpolysiloxane having, per molecule, at least 2 hydrogen atoms that are directly bonded to silicon atoms, the component (B) being in an amount where the number of the hydrogen atoms that are directly bonded to the silicon atoms is 0.5 to 1.5 per 1 alkenyl group in the component (A);

(C) 500 to 7,000 parts by mass of a thermally conductive filler having a thermal conductivity of not lower than 10 W/m·K;

(D) 10 to 300 parts by mass of a dimethylpolysiloxane with one molecular chain end being blocked by a trialkoxy group, that is represented by the following general formula (1)

(1)

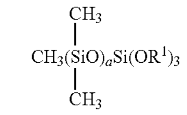

wherein $R^1$ independently represents an alkyl group having 1 to 6 carbon atoms, and a is a number of 5 to 100;

(E) an effective amount of a platinum group metal-based curing catalyst;

(F) benzotriazole and/or a benzotriazole derivative represented by the following general formula (2), the component (F) being in an amount of 10 to 500 ppm per a total mass of the components (A) to (D)

(2)

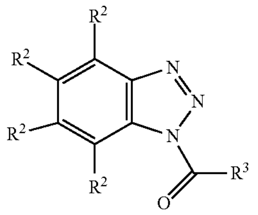

wherein $R^2$ independently represents a hydrogen atom or a monovalent hydrocarbon group having 1 to 6 carbon atoms, and $R^3$ represents a hydrogen atom or a monovalent organic group; and (G) 1 to 100 parts by mass of an organopolysiloxane represented by the following general formula (3)

(3)

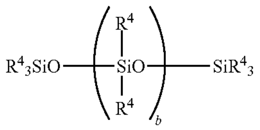

wherein $R^4$ independently represents an aliphatic unsaturated bond-free monovalent hydrocarbon group having 1 to 10 carbon atoms, and b is a number of 2 to 2,000.

2. The thermally conductive silicone composition according to claim 1, wherein the component (G) is an organopolysiloxane represented by the following general formula (4)

(4)

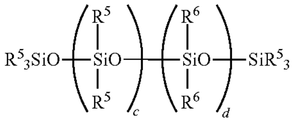

wherein $R^5$ independently represents an alkyl group having 1 to 10 carbon atoms, $R^6$ represents a phenyl group, c and d each represent a number of 1 to 20, where the siloxane units in the parentheses are arranged in a random, alternating or block order.

3. The thermally conductive silicone composition according to claim 1, wherein the thermally conductive silicone composition further comprises at least one kind of addition reaction control agent (H) selected from the group consisting of an acetylene compound, a nitrogen compound, an organic phosphorus compound, an oxime compound, and an organic chloro compound.

4. The thermally conductive silicone composition according to claim 1, wherein $R^3$ in the general formula (2) represents a hydrogen atom, a monovalent hydrocarbon group having 1 to 10 carbon atoms, or a group represented by the following formula (5)

(5)

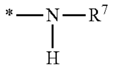

wherein $R^7$ represents a monovalent hydrocarbon group having 1 to 15 carbon atoms, or $-(CH_2)_e-Si(OR^8)_3$, wherein $R^8$ independently represents an alkyl group having 1 to 4 carbon atoms, or a $SiR^9_3$ group, wherein $R^9$ independently represents an alkyl group having 1 to 4 carbon atoms, and e is an integer of 1 to 6, and * represents a bond.

5. A cured product of the thermally conductive silicone composition according to claim 1.

* * * * *